No. 636,124.  
C. U. FARRAR.  
COFFEE OR GRAIN MILL.  
(Application filed May 16, 1898.)  
Patented Oct. 31, 1899.
(No Model.)
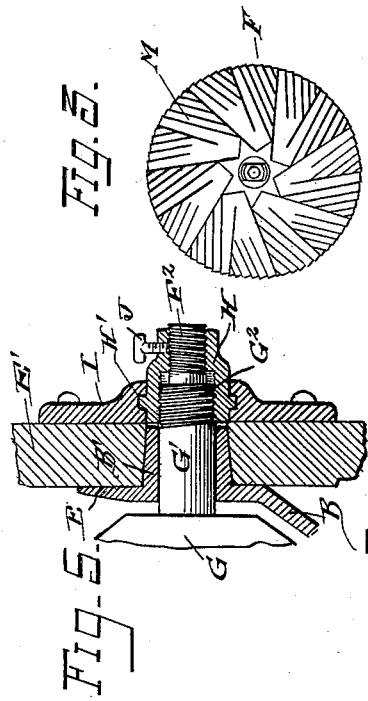
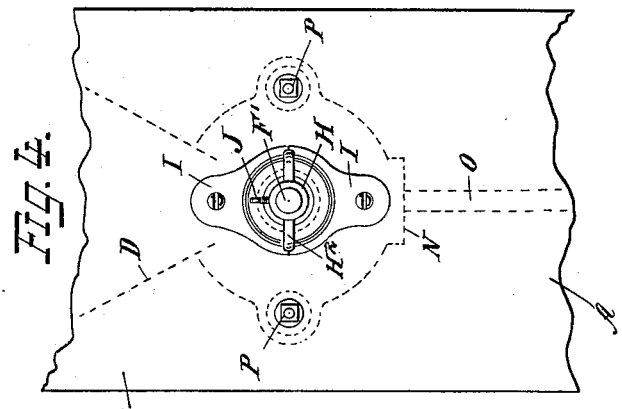
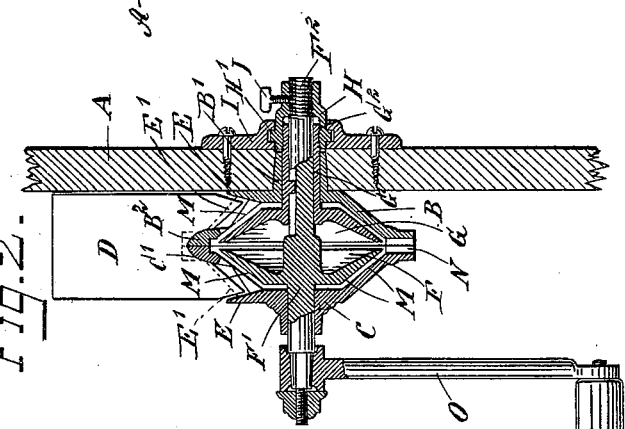
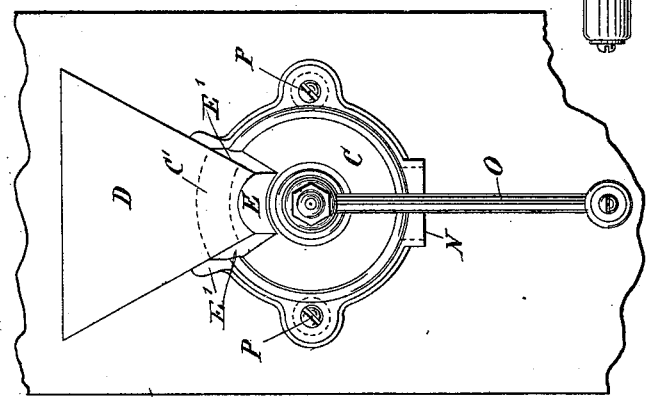
WITNESS:  
Henry Graban  
J. O. Farrar
INVENTOR  
Charles U. Farrar  
BY  
ATTORNEY

UNITED STATES PATENT OFFICE.

CHARLES UNCAS FARRAR, OF NEW ORLEANS, LOUISIANA.

COFFEE OR GRAIN MILL.

SPECIFICATION forming part of Letters Patent No. 636,124, dated October 31, 1899.

Application filed May 16, 1898. Serial No. 680,803. (No model.)

*To all whom it may concern:*

Be it known that I, CHARLES UNCAS FARRAR, of New Orleans, in the parish of Orleans and State of Louisiana, have invented a new and Improved Coffee or Grain Mill, of which the following is a full, clear, and exact description.

The object of the invention is to provide a new and improved coffee and grain mill which is simple and durable in construction, very effective in operation, and arranged for convenient adjustment to permit of properly grinding the material coarse or fine, as may be desired.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a front elevation of the improvement. Fig. 2 is a transverse section of the same. Fig. 3 is a face view of one of the grinding-wheels, and Fig. 4 is a rear face view of the improvement.

On a suitable board or other support A is secured the casing for the mill, said casing being made in sections B and C, of which the section B is formed with a hub B', secured in the support A, as indicated in Fig. 2. The casing-sections B and C are open at the top, and a longitudinal partition extends longitudinally through said opening to divide the material passing through the hopper D into the casing and grind it at the inner surface of the rear section B of the casing, as well as on the inner face of the casing-section C. The partition referred to is formed by two longitudinally-extending bars $B^2$ and C', integral on the casing-sections B and C, respectively. The lower end of the hopper D rests on lips E, the sides of the hopper resting against bars E', both the lips and bars forming integral parts of the casing-sections B and C. In the casing thus formed is mounted to rotate a grinder consisting of two cone-shaped grinding-wheels F and G, adjustably held relatively to each other and to the inner beveled faces of the sections B and C, respectively, to insure proper grinding of the material passed into the casing from the hopper D. In order to secure this adjustment, I fix the wheel F on a shaft F', journaled at its forward end in the casing-section C and at its rear end in the hollow hub G' of the other section G. The extreme rear end $F^2$ of the shaft F' is formed with a left-hand thread on which screws the corresponding thread of a nut H, and the said nut is formed with a second and right-hand thread screwing on the right-hand threaded end $G^2$ of the hub G' of the grinding-wheel G. The nut H is held to turn in fixed bearings by being formed with an external collar H', mounted to turn in the grooved bearing-plates I, bolted or otherwise secured to the rear face of the support A, as is plainly indicated in Figs. 2 and 4. The nut H is provided with wings $H^2$, adapted to be taken hold of by the operator for convenience in turning the nut.

Now it will be seen that when it is desired to adjust the wheels F and G toward or away from the sections B and C the nut H is turned on the threaded end $F^2$ of the shaft F', the operator catching hold of the operating-handle arm O, secured to such shaft to prevent the shaft from turning, and by reason of the nut H being rotatable in fixed bearings the shaft F' and its grinding-wheel F are drawn away from or pushed toward the section C, according to the direction in which the nut H is turned. At the same time the hub G' and its grinding-wheel G will be moved in an opposite direction by reason of the opposite direction of the screw-threads on the hub G' from those on the shaft F', and thus it will be seen any turning of the nut H relative to the shaft F' will cause the two grinding-wheels to simultaneously approach or recede from each other, and therefore approach or recede from the casing-sections B and C.

In order to insure the above-described operation, I form the shaft F' with a slot $F^3$, in which is received a feather $G^3$ on the hub G', thereby allowing only longitudinal movement of the grinding-wheels with respect to each other—that is, preventing the hub G' from rotating on the shaft F'.

A set-screw J in the nut H serves to fasten the said nut to the threaded end $F^2$ of the shaft F' after adjustment has been made as described above.

The adjacent beveled faces M of the casing and the grinding-wheel are formed with the usual teeth or dress, as is plainly indicated in Fig. 3, to insure proper grinding of the material passing between the said faces. The casing is further provided at its lower end with an outlet-opening N, through which passes the ground material to a suitable receptacle held below said opening.

Bolts P are employed for fastening the two casing-sections B and C together, as indicated in Figs. 1 and 4.

Now it will be seen that by the arrangement described proper adjustment of the grinding-wheels relative to the casing-sections can be made, so as to properly compensate for wear on the dress and also for grinding the material coarser or finer, as desired.

Having thus fully described my invention, I claim as new and desire to secure by Letters Patent—

1. A coffee and grain mill, comprising a casing, grinding-wheels mounted to rotate in the said casing, one of said wheels being provided with a shaft and the other having a hollow hub fitted to slide on said shaft, means for holding one wheel non-rotatable relative to the other, and a nut rotatable in fixed bearings on the casing and having right and left hand threads engaging corresponding threads on the said shaft and hollow hub, whereby the grinding-wheels may be simultaneously adjusted toward each other or away from each other, as and for the purpose set forth.

2. A coffee or grain mill, comprising a casing, a shaft mounted to rotate in said casing, a grinding-wheel fixedly held on said shaft a second grinding-wheel fitted to slide on said shaft and provided with means whereby it is held from rotation relatively to the shaft, an adjusting device held to rotate in fixed bearings and a connection between said adjusting device, the slidable wheel and the shaft whereby a rotation of said nut with respect to such wheel and shaft will cause opposite longitudinal movements of the same, as and for the purpose set forth.

3. A coffee and grain mill, provided with grinding-wheels formed one with a shaft and the other with a hollow hub fitted thereon whereby they are fitted to slide toward or from each other, means for preventing the rotation of one wheel with respect to the other, and a nut mounted to turn in fixed bearings, and having right and left hand threads engaging corresponding threads on the shaft and hub of the grinding-wheels, as set forth.

4. A coffee or grain mill, comprising a casing having inner oppositely-arranged grinding-faces, grinding-wheels mounted to turn in the casing, a fixed bearing on said casing, and a nut mounted to turn in said fixed bearing and connected with both wheels, the said nut drawing said wheels simultaneously toward or from each other when turned relative to the wheels, as set forth.

CHARLES UNCAS FARRAR.

Witnesses:
J. O. FARRAR,
L. A. HAUNER.